UNITED STATES PATENT OFFICE.

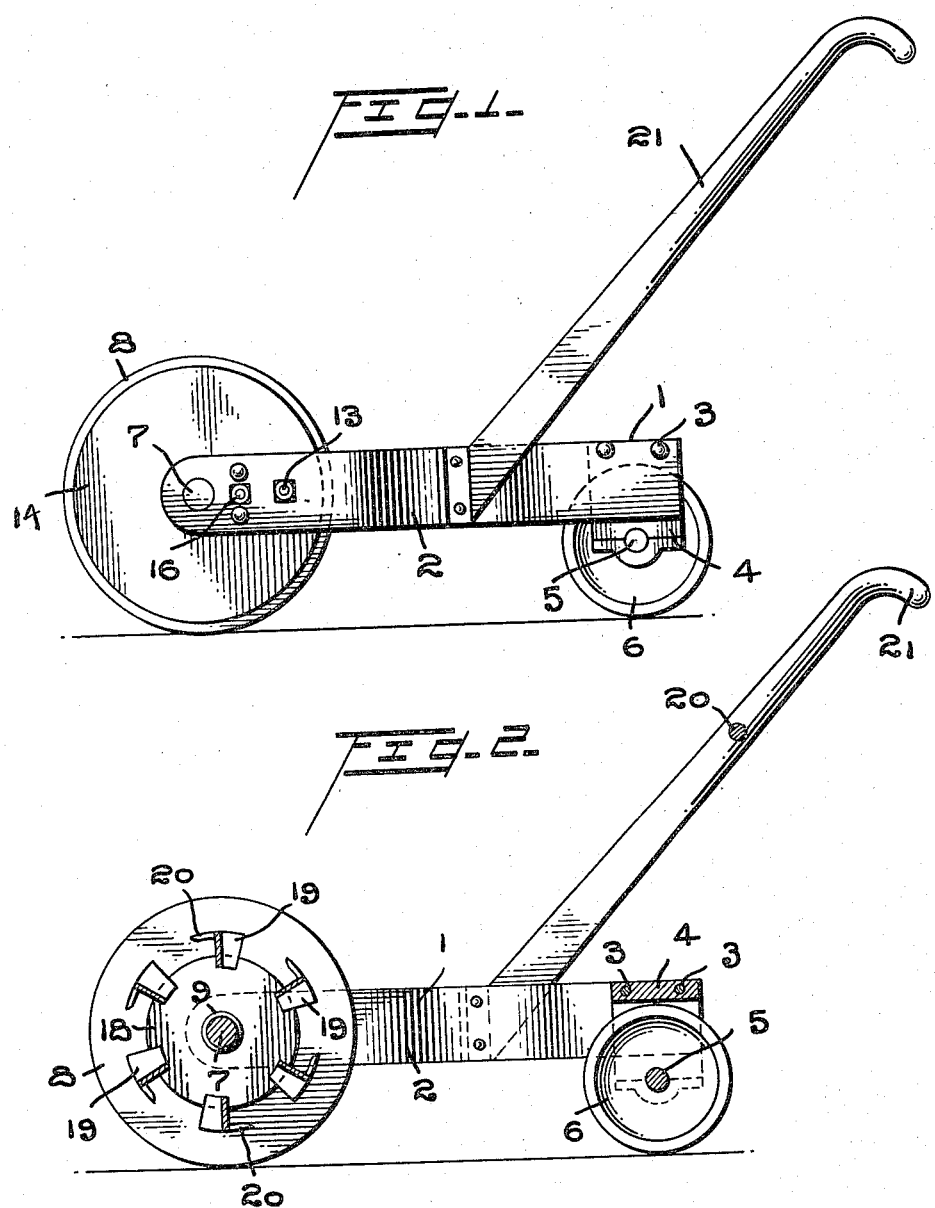

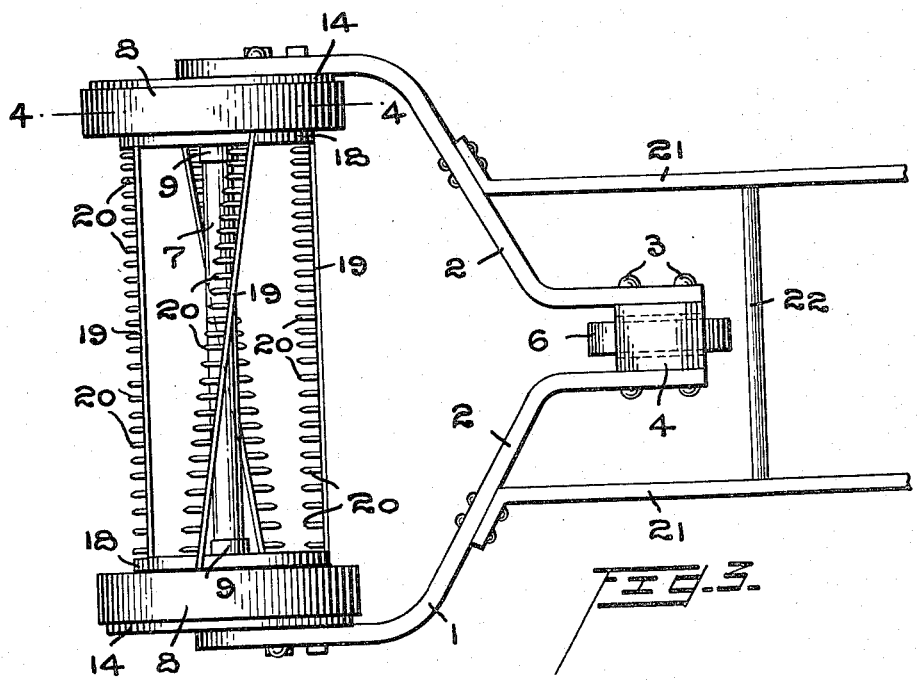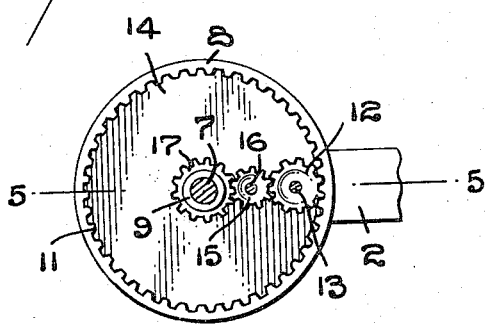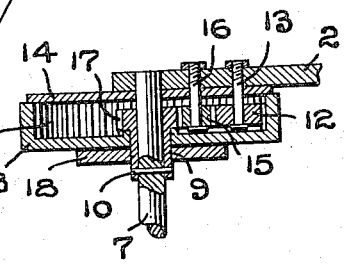

RUDOLPH H. PARIS, OF PHILADELPHIA, PENNSYLVANIA.

RIDGE-CUTTER.

1,160,443.  Specification of Letters Patent.  Patented Nov. 16, 1915.

Application filed March 24, 1915. Serial No. 16,579.

*To all whom it may concern:*

Be it known that I, RUDOLPH H. PARIS, a citizen of the United States, residing at Philadelphia, in the county of Philadelphia and State of Pennsylvania, have invented certain new and useful Improvements in Ridge-Cutters, of which the following is a specification.

My invention relates to improvements in ridge cutters, the object of the invention being to provide a machine which is designed to be moved over the ground and cut the top from ridges so as to permit the rapid growth from seed planted in the ridges.

Heretofore, it has been the common practice to plant the seed in ridges, and after the surface of the ridge becomes hard, to remove the same by means of a hoe or other tool. This work is extremely laborious and is more or less inaccurately done.

It is the purpose of my invention to provide a machine which can be rolled over the ground, and which will uniformly and rapidly cut off the tops of the ridges, and I have especially designed the machine for cutting two ridges simultaneously, thereby saving time and labor.

With these and other objects in view, the invention consists in certain novel features of construction and combinations and arrangements of parts as will be more fully hereinafter described and pointed out in the claims.

In the accompanying drawings: Figure 1 is a view in side elevation illustrating my improved machine. Fig. 2 is a view in longitudinal section through the center of the machine. Fig. 3 is a top plan view. Fig. 4 is a view in section on the line 4—4 of Fig. 3, and Fig. 5 is a view in section on the line 5—5 of Fig. 4.

1 represents a frame which is composed of two members 2, 2, secured together at their rear end by means of rivets 3. These rivets 3 also pass through a bifurcated bracket 4 having a journal 5 therein mounted in a relatively small wheel 6 adapted to run on the ground and support the rear end of the frame 1.

The forward end of the frame 1 is supported on an axle 7 which is mounted in wheels 8 adapted to run on the ground and impart the necessary motion to the working parts of the machine.

The wheels 8 turn on sleeves 9, which are secured by pins 10 or otherwise to the axle 7. The wheels 6 are hollow, and have internal racks 11 which mesh with pinions 12 supported on journal bolts 13 secured to the side members 2 of frame 1, and projected through covering disks 14, said disks 14 closing the outer face of the wheels, and covering the gears confined within the wheels.

The pinions 12 transmit motion to other pinions 15 supported on journal bolts 16 secured to frame members 2, and said last-named pinions 15 mesh with pinions 17 secured to turn with the sleeves 9 and impart a rotary movement to the axle.

On the sleeves 9 adjacent the wheels 8, disks 18 are secured and are connected by transversely disposed rakes 19. The rakes 19 are located at an angle to the axle 7 and are each provided with a plurality of teeth 20 which cut into the soil and pulverize the same as the latter is forced to one side by the body portion of the rake and in a finely divided condition. This positioning of the rakes at an angle serves to deflect the dirt to one side and not force the same ahead, and the teeth cut up the soil so that it is in the best possible condition for the growing plants.

It is my intention to cut two ridges at a time, hence the wheels 6 and 8 will run between the ridges, and the operator can walk between the ridges and force the machine forwardly by pressure upon suitable handles 21 which are secured to the frame bars 2, 2, and are strengthened by a lateral brace 22. As the machine is moved over the ground, the wheels 8 will, through the medium of pinions 12, 15, and 17, impart a rotary movement to the axle, and also the rakes 19 carried by the disks 18. These rakes will be rapidly moved, and will in succession, engage the soil, not only cutting the top of the ridge, but also pulverizing the soil, so that it is in good shape to permit the rapid growth of the plant from the seed.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what

I claim as new and desire to secure by Letters Patent is:

1. A machine of the character described, comprising a pair of hollow wheels, covering disks closing the outer faces of the wheels, an axle extending through the wheels and through the covering disks, a frame secured to the covering disks, disks secured to the axle and located against the inner faces of the wheels, said last-mentioned disks being smaller in diameter than the wheels, and soil cutters supported by the outer edges of said last-mentioned disks, substantially as described.

2. A machine of the character described, comprising a pair of hollow wheels, covering disks closing the outer faces of the wheels, an axle extending through the wheels and through the covering disks, a frame secured to the covering disks, disks secured to the axle and located against the inner faces of the wheels, said last-mentioned disks being smaller in diameter than the wheels, soil cutters supported by the outer edges of said last-mentioned disks, said wheels having circular racks on their inner faces, and gear trains in the hollow wheels supported by said covering disks and connecting the rack and axle, substantially as described.

3. A machine of the character stated, comprising hollow wheels, an axle supported in the wheels, two frame bars supported on the axle, and at their rear ends converging toward each other, a block secured between the rear ends of the bars, a wheel supporting the block, and located in a line midway between the first-mentioned wheels, disks on the axle, soil cutting devices carried by the disks, and gearing in the wheels imparting motion from the wheels to the said disks, substantially as described.

4. A machine of the character stated, comprising hollow wheels, an axle supported in the wheels, two frame bars supported on the axle, and at their rear ends converging toward each other, a block secured between the rear ends of the bars, a wheel supporting the block, and located in a line midway between the first-mentioned wheels, disks on the axle, soil cutting devices carried by the disks, gearing in the wheels imparting motion from the wheels to the said disks, and covering disks closing the hollow wheels, secured to the said frame bars, and supporting certain of said gears, substantially as described.

In testimony whereof I have signed my name to this specification in the presence of two subscribing witnesses.

RUDOLPH H. PARIS.

Witnesses:
MARIE JACKSON,
CHAS. E. POTTS.

Copies of this patent may be obtained for five cents each, by addressing the "Commissioner of Patents, Washington, D. C."